United States Patent [19]
Breithaupt et al.

[11] Patent Number: 5,509,606
[45] Date of Patent: Apr. 23, 1996

[54] INSTANT HOT WASH DEVICE

[75] Inventors: Howard K. Breithaupt, Chalfont; Barry S. Haines, Harlesville, both of Pa.

[73] Assignee: Koltech, Inc., Richland, Mich.

[21] Appl. No.: 131,476

[22] Filed: Oct. 4, 1993

[51] Int. Cl.$^6$ ..................................................... B60S 1/46
[52] U.S. Cl. ........................... 239/130; 239/284.1
[58] Field of Search .................... 239/284.1, 284.2, 239/130, 135, 139; 222/146.5

[56] References Cited

U.S. PATENT DOCUMENTS

| | | | |
|---|---|---|---|
| 3,292,866 | 12/1966 | Benner | 239/284.1 |
| 3,632,042 | 1/1972 | Goulish | 239/284.1 |
| 3,756,510 | 9/1973 | Nitterl et al. | 239/130 |
| 4,090,668 | 5/1978 | Kochenour | 239/130 |
| 4,508,957 | 4/1985 | Rocchitelli | 239/284.1 |
| 4,700,424 | 10/1987 | Hagen | 239/284.1 |
| 4,832,262 | 5/1989 | Robertson | 239/284.1 |
| 4,927,060 | 5/1990 | Snowball et al. | 222/146.5 |

FOREIGN PATENT DOCUMENTS

| | | | |
|---|---|---|---|
| 2329664 | 1/1975 | Germany | 239/284.2 |
| 2606954 | 9/1976 | Germany | 239/284.2 |
| 2539562 | 3/1977 | Germany | 239/284.1 |
| 1451666 | 10/1976 | United Kingdom | 239/130 |

*Primary Examiner*—Andres Kashnikow

[57] ABSTRACT

A washer fluid system including a reservoir having a discharge for transferring fluid through a transfer hose via at least one discharge nozzle aligned to discharge the fluid onto a windshield of the vehicle. The device includes a housing having an inlet to receive fluid from the transfer hose at a point downstream from a discharge motor and an outlet to discharge fluid to the transfer hose for discharge by the nozzle. Fluid is held by a container operably connected to the inlet and the outlet. A heating element, preferably powered by the vehicle's electrical system, most preferably only when the ignition for the vehicle is in the on position, heats fluid in the container to a temperature which does not exceed a predetermined maximum temperature such as 50° F. above ambient temperature. Insulation is provided for insulating the container in the housing. The heater device is preferably positioned on the fire wall of the vehicle proximate a pair of discharge nozzles for the windshield of an automobile or the like by a bracket. Preferably the housing and the container are axially concentric spaced apart cylinders, the inlet and outlet are tubular hoses axially aligned therewith, and the insulation comprises a hollow cylindrical filling the space between the housing cylinder and the container cylinder.

9 Claims, 2 Drawing Sheets

INSTANT HOT WASH DEVICE

FIELD OF THE INVENTION

The present invention relates to an instant hot wash device for vehicle windshields such as automobiles, trucks, buses, trains, planes and the like. More particularly the present invention relates to a device for controlling the temperature and availability of windshield washing fluid over a complete spectrum of temperature and climate conditions whereby the device is independent of both the environment and the operating conditions of the vehicle.

BACKGROUND OF THE INVENTION

Clean windshields are important for safety reasons and it has long been known that virtually all vehicles such as automobiles, trucks and the like have been equipped with what are known as windshield washing devices. These windshield washers include a fluid reservoir, a pump, hoses for transferring the washer fluid, and nozzles for spraying the washer fluid on to the windshield. The purpose of these devices is, of course, to provide water, washing fluids including detergents or other additives, and the like to the windshield in order to clean the windshield.

In many if not all systems, the washer equipment is designed to operate in conjunction with the windshield wiper system, so that the fluid can be spread over the windshield and loosen and remove dirt, ice, dust or other contaminants that have reduced visibility. In colder climates, where temperatures drop below freezing, it is necessary to add antifreeze to the washer fluid to prevent the fluid from freezing in the reservoir or connecting hoses. At those times, it is often necessary to wait until the defroster has melted or otherwise loosened ice or snow that may have accumulated on the windshield from weather conditions. Sometimes, the windshield wiper system becomes frozen from melted and re frozen ice or snow and it is necessary to clean the windshield and free the wiper system by hand. Other times the combination of cold, dirt, frozen wiper blade systems all cooperate to smear and otherwise obscure the windshield, requiring a special effort to restore safe and adequate visibility. At best this is a cold and unpleasant task. At worst it exposes the operator to inclement weather and other dangers of the environment. For weak, elderly and frail persons, this becomes more than an inconvenience.

One system has been proposed to remedy the above described difficulties. This system is described in U.S. Pat. No. 4,832,262 to Robertson. Robertson describes a heat exchange member which is contoured to fit along one side of an exhaust pipe of a vehicle. Hoses are provided to circulate water or washer fluids from the reservoir to the heat exchanger to the pump and finally to the windshield. Robertson discloses a system which requires engine heat, thus being less than effective when a cold vehicle has just been started. This prior art system also requires that the fluid be pumped to the heat exchanger and then to the windshield washer nozzles, so that as the engine continues to heat, fluid or vapor from the fluid continues to flow even after the washer device has been turned off. Once the automobile or truck has achieved a hot, operating condition it has been found that the Robertson system actually reduces visibility by continuing to discharge a fine mist that is not wet enough to be cleaned quickly by the windshield wipers. This mist dries quickly, leaving a film that continues to reduce visibility rather than clean the windshield.

Accordingly, it is an object of the present invention to provide a windshield washer system that can be modified to operate in cold and unpleasant weather without regard for engine temperature or operation.

Another object of this invention is to provide a device which is capable of providing warm or even hot washer fluid to a windshield washer system without waiting for the vehicle engine to generate heat.

Yet another object of the present invention is to provide a device capable of providing warm or hot washer fluid without continuing to contaminate the windshield with unwanted spray or mist after the system has been deactivated.

Other objects will appear hereinafter.

SUMMARY OF THE INVENTION

It has now been discovered that the above and other objects of the present invention may be accomplished in the following manner. Specifically, the present invention provides a substantial improvement in existing washer fluid systems in use in vehicles such as automobiles or trucks. The typical windshield washer system includes a reservoir or washer fluid bottle that has a discharge for transferring washer fluid through hoses to discharge nozzles aligned to discharge the washer fluid directly onto a windshield of the vehicle.

The device of the present invention includes a housing having an inlet to receive fluid from the transfer hose at a point downstream from a discharge motor connected to the reservoir. The housing also includes an outlet to discharge fluid to the transfer hose for discharge by the nozzle. Fluid is held by a container operably connected to the inlet and the outlet where it is heated before it is discharged.

A heating element heats fluid in the container to a temperature which does not exceed a predetermined maximum temperature such as 50° F. above ambient temperature. The heating element is preferably powered by the vehicle's electrical system so that auxiliary power is not needed. In order to prevent excessive drain on the vehicle's battery it is most preferred that the heating element operate only when the ignition switch for the vehicle is in the on position.

Since the device is normally operated in cold climate circumstances, it is desirable that cold be kept from the fluid in the container. Also, as engine heat is generated after operation over a period of time, particularly in heavy traffic where there is little air circulation, this engine heat can in some cases overheat the washer fluid, causing excessive evaporation or even boiling. Accordingly, in a preferred embodiment, insulation is provided for insulating the container in the housing. The heater device is preferably positioned on the fire wall of the vehicle proximate a pair of discharge nozzles for the windshield of an automobile or the like by a bracket.

Preferably the housing and the container are axially concentric spaced apart cylinders, the inlet and outlet are tubular hoses axially aligned therewith, and the insulation comprises a hollow cylindrical filling the space between the housing cylinder and the container cylinder.

BRIEF DESCRIPTION OF THE DRAWINGS

For a more complete understanding of the invention, reference is hereby made to the drawings, in which.

DESCRIPTION OF THE PREFERRED EMBODIMENT

Figure 1:
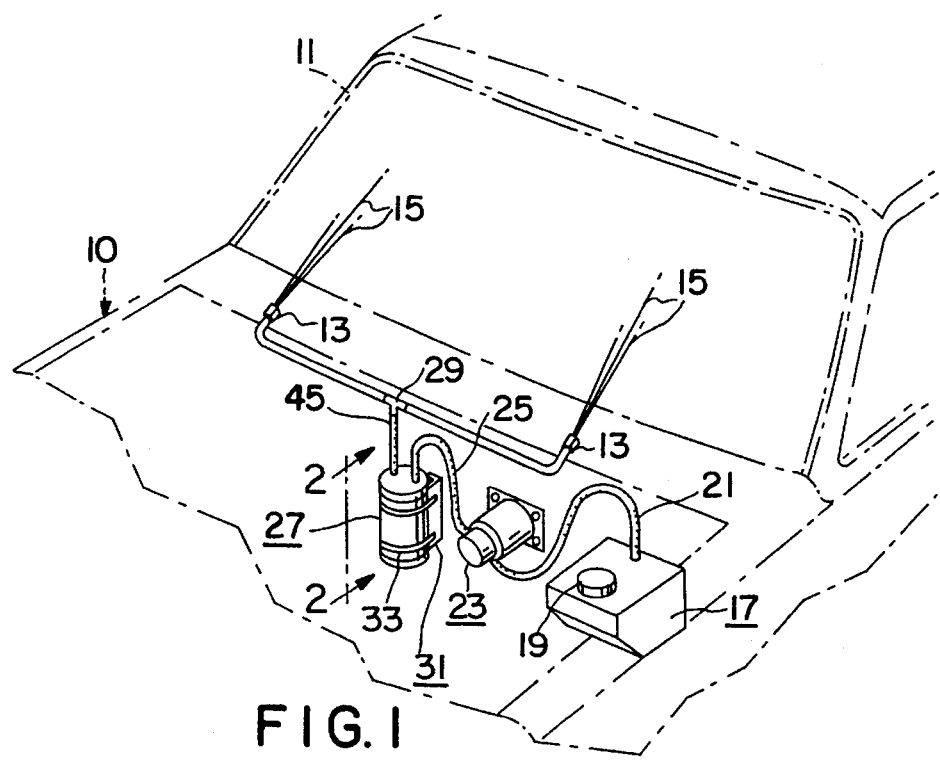
FIG. 1 is a semi-schematic, fragmentary perspective view showing a portion of the hood and windshield of a typical automobile shown in dot and dash with the device of this invention shown in full line, illustrating an arbitrary location for the device.

As shown in the drawings, a vehicle 10 includes a windshield 11 which is, from time to time, in need of washer fluid sprayed thereon by nozzles 13, to clean or de-ice or otherwise improve the vision qualities of the windshield. Spray 15 is directed onto the windshield 11 from the nozzles 13 to accomplish the desired results, usually in cooperation with a windshield wiper blade or blades, not shown.

The present invention contemplates the addition of the device of the present invention to an existing windshield washing unit on a vehicle. As shown in FIG. 1, a fluid reservoir 17 is normally present in most vehicles, certainly all manufactured in recent years for personal use in the United States. Reservoir 17 is filled with washer fluid, normally a fluid which contains detergent, antifreeze or other components in water, via cap 19. Fluid flows from reservoir 17 through hose 21 into the inlet side of pump 23, exiting pump 23 through discharge hose 25 into heater 27. Fluid is then pumped out of heater 27 by pump 23 upon command, by conventional controls inside the vehicle, not shown, to "T" shaped hose 29, and to nozzles 13.

Figure 2:
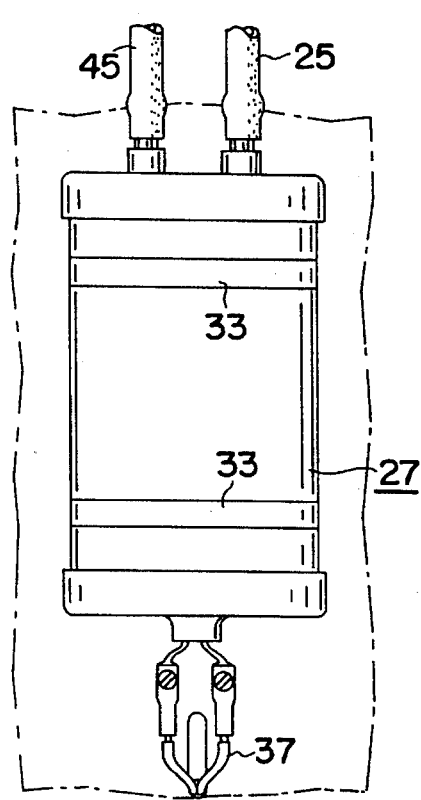
FIG. 2 is an enlarged, fragmentary, front elevational view of the device as viewed on the line 2,2 of FIG. 1.
Figure 3:
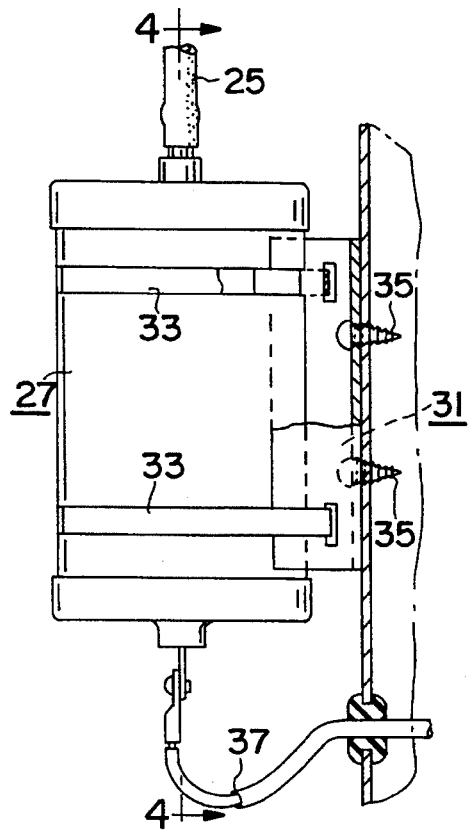
FIG. 3 is a right side, elevational view of the device shown in FIG. 2, with additional details shown.

One preferred method of mounting the heater 27 of this invention is illustrated in FIG. 1 where bracket 31 and clamps 33 mount heater 27 to the fire wall of the vehicle. As can be seen in FIG. 2, clamps 33 are flat straps, usually of metal, which wrap heater 27 and fit into bracket 31 as shown in FIG. 3. Screws 35 fasten bracket 31 to the fire wall. Electrical power is supplied to heater 27 via electrical wiring 37 through the fire wall, shown in FIG. 3. Wiring 37 is connected at its other end to the control switch that operates the windshield wiper and washer.

Figure 4:
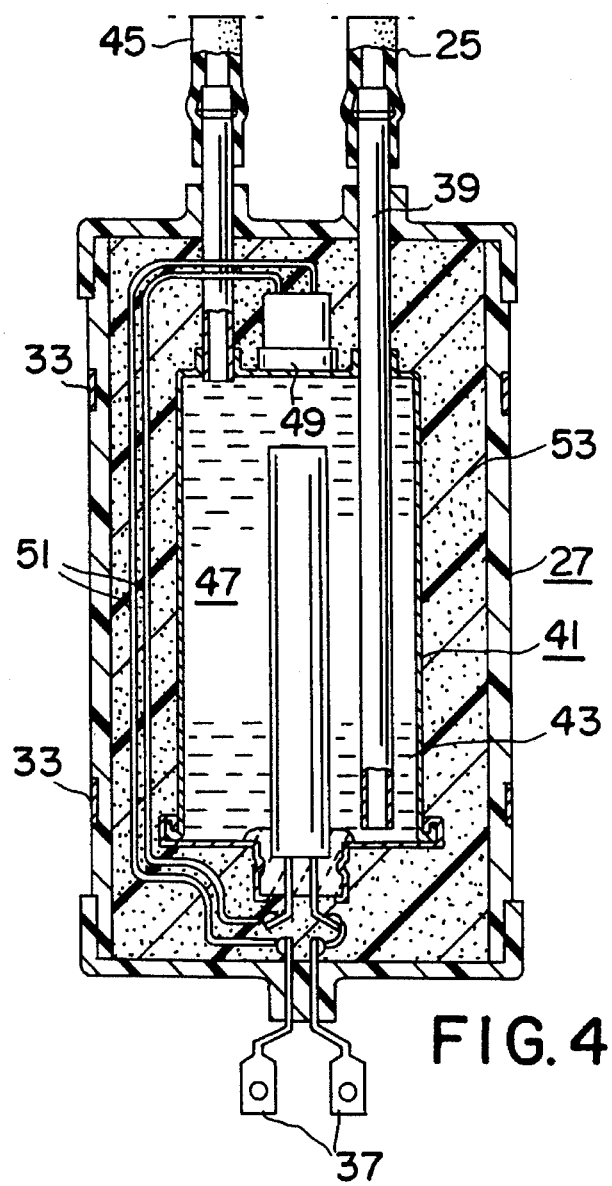
FIG. 4 is an enlarged, sectional, elevational view taken on the line 4,4 of FIG. 3.

Turning now to FIG. 4, the specific details of the preferred embodiment of the present invention are shown. Specifically, heater device 27 is formed as a cylindrical housing in which the inlet tube 39 is introduced, with the inlet tube being connected to the fluid in pump 23 and pump discharge hose 25. As noted, inlet 39 is positioned inside tank or container 41 which becomes filled with fluid 43 from pump 23. When pump 23 is turned on, fluid 43 flows from washer fluid reservoir 17 to the bottom of container 41, this fluid being at ambient temperature. Normally, ambient temperature is below that which is most effective for cleaning windshields, particularly in winter months and in colder climates.

Fluid 43 exits container 41 through outlet tube 45, "T" fitting 29 and connecting distribution hoses to nozzles 13. Also forming part of heater 27 is a heating element 47 which is powered by electrical power from electrical wires 37. Heating element 47 is also controlled by temperature controller 49, also powered by electrical power from electrical wires 51 and power wires 37. The temperature of fluid 43 in container 41 is maintained at a predetermined maximum temperature no more than about 50° F. above ambient temperature. Foam insulation 53 assists in maintaining this constant temperature of the fluid 43 within container 41 as long as the ignition switch is on and power is supplied to the device. Foam insulation 53 is thus placed within a hollow cylinder between said housing cylinder 27 and said container cylinder 41.

Figure 5:
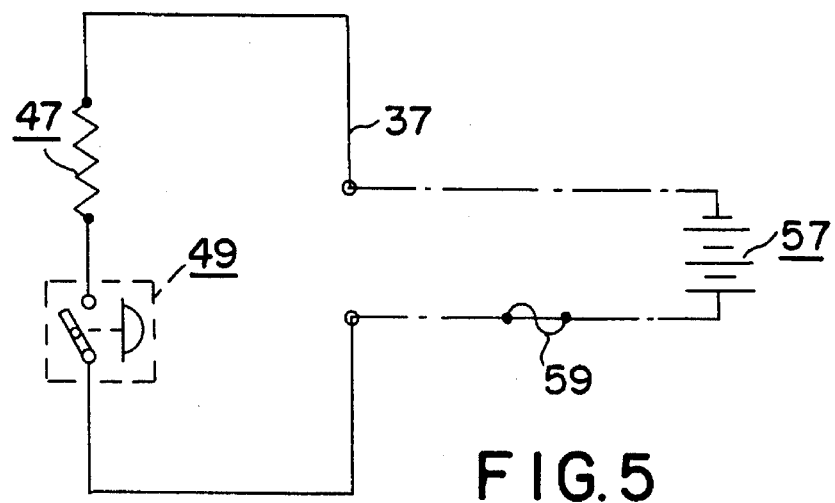
FIG. 5 is a schematic view of the electrical components of the device of this invention.

FIG. 5 shows the simple electrical circuit for the device of this invention. Heater element 47 receives power via wires 37 upon closing the switch 55 contained within temperature controller 49. Battery 57 and fuse 59 complete the circuit. Obviously, it is not desirable to supply power to a device when the vehicle is idle and not in use for long periods of time. For that reason, when the device is installed, it is intended that it be connected to a wire which is 'hot' or electrically powered only when the ignition is on. Installation is straightforward based upon the forgoing description.

When the vehicle is to be used and the ignition switch is turned on, heater element 47 heats fluid 43, preferably as stated above to a predetermined maximum temperature of about 50° F. above ambient temperature. This fluid is ready when the operator desires to clean the windshield. As fluid is withdrawn from the top of container 41 via exit tube 45, cooler fluid is introduced via inlet tube 39 to the bottom of the container 41. Thus the warmer fluid is proximate the exit and also proximate the temperature controller 49 so that properly heated fluid is dispensed through nozzles 13.

This is an important feature of the invention. Fluid is not too hot, and when the device is stopped does not continue to heat, generating steam or vaporized fluid to fog the windshield or cause other problems. Fluid is not too cold and will not freeze on the windshield. Rather, the properly conditioned fluid melts ice, dissolves grease, loosens dirt and mud, and otherwise performs much better than systems which do not properly control the exit temperature.

As noted previously, U.S. Pat. No. 4,832,262 to Robertson. Robertson describes a heat exchange member which is contoured to fit along one side of an exhaust pipe of a vehicle. This prior art device does not provide a uniform temperature, is complicated to install and potentially harmful to exhaust systems if not properly installed, and is slow to operate when the engine temperature of the vehicle is low.

In order to demonstrate the efficacy of the present invention, tests were conducted to simulate adverse weather conditions often found in cold winter climates. Specifically, an automobile fitted with the present invention was frozen for fifteen hours at a temperature of −15° F. after having water sprayed over the entire windshield and front part of the car. The cold temperatures froze a thick coating of ice on the windshield so that the windshield wiper system was unable to operate. The device of the present invention, which had been installed on the vehicle prior to the test, was turned on, heating the windshield washer fluid to 85° F. in 35 seconds. Within two minutes from the moment the device was turned on, the entire windshield had been cleared of ice and was completely clean. A companion test of the prior art system using heat from the motor exhaust system took over ten minutes to free the windshield from ice and did not stop generating mist and spray when shut off, thereby reducing visibility when the vehicle was in use. Leaks also developed in the tank, providing unreliable operation. By contrast, continued operation of the vehicle having the present invention installed in it resulted in no mist or other contamination of the windshield, thus resulting in a completely satisfactory test obviating all of the faults of the prior art system.

While particular embodiments of the present invention have been illustrated and described, it is not intended to limit the invention, except as defined by the following claims.

We claim:

1. In a washer fluid system in a vehicle, said system including a fluid reservoir having a discharge pump for transferring fluid from said reservoir through a transfer hose, at least one discharge nozzle aligned to receive fluid from said transfer hose to discharge said fluid onto a windshield of said vehicle, a heater device comprising:

a housing having an inlet to receive fluid from said transfer hose at a point downstream from said discharge pump and an outlet to discharge fluid to said transfer hose for discharge by said nozzle;

a container means in said housing for holding a quantity of fluid, said container means being operably connected to said inlet and said outlet for holding fluid to be heated;

heating element means in said container for heating fluid introduced from said inlet prior to discharge by said outlet;

temperature controller means for regulating the temperature of said fluid in said container to a predetermined maximum temperature above ambient temperature;

insulation means for insulating said container in said housing; and bracket means for mounting said housing in said vehicle.

2. The device of claim 1, wherein said predetermined maximum temperature is no more than about 50° F. above ambient temperature.

3. The device of claim 1, wherein said heating element is powered by the electrical system of said vehicle.

4. The device of claim 2, wherein said heating element is connected to said electrical system only when the ignition for said vehicle is in the on position.

5. The device of claim 1, wherein said housing and said container are axially concentric spaced apart cylinders, said inlet and outlet are tubular hoses axially aligned with said container cylinder.

6. The device of claim 5, wherein said insulation means comprises a hollow cylinder filling said space between said housing cylinder and said container cylinder.

7. In a washer fluid system in a vehicle, including a discharge pump for transfer of fluid from a reservoir to a discharge nozzle at one end of a conduit to discharge the fluid onto a windshield of the vehicle, a heater device comprising:

a container downstream of the discharge pump connected to the conduit by inlet and outlet means, said inlet means for receiving the fluid from the conduit transferred from the reservoir, said outlet means for discharging the fluid from the container means to the conduit;

a housing surrounding said container means;

heating element means in said container means for heating the fluid introduced from said inlet means prior to discharge by said outlet means, said heating means being the only means for heating the fluid;

temperature control means in said container means for regulating the temperature of the fluid in said container means to a predetermined maximum temperature above ambient temperature; and insulation means for insulating said container means in said housing.

8. The device of claim 7, wherein said container includes a lower portion and an upper portion, and said inlet means receive the fluid proximate said lower portion of said container, and said outlet means discharge the fluid proximate said upper portion of said container.

9. In a washer fluid system in a vehicle, including a discharge pump for transfer of fluid from a reservoir to a discharge nozzle at one end of a conduit to discharge the fluid onto a windshield of the vehicle, a heater device comprising:

a container downstream of the discharge pump connected to the conduit by inlet and outlet means, said inlet means for receiving the fluid from the conduit transferred from the reservoir, said outlet means for discharging the fluid from the container means to the conduit;

a housing surrounding said container means;

heating element means in said container means for heating the fluid introduced from said inlet means prior to discharge by said outlet means, said heating means being the only means for heating the fluid;

temperature control means in said container means for regulating the temperature of the fluid in said container means; and insulation means for insulating said container means in said housing.

* * * * *